United States Patent
Xu et al.

(10) Patent No.: US 10,863,331 B2
(45) Date of Patent: Dec. 8, 2020

(54) METHOD AND APPARATUS FOR MANAGING VEHICLE GROUPS IN INTERNET OF VEHICLES

(71) Applicant: ZTE CORPORATION, Guangdong (CN)

(72) Inventors: Hui Xu, Guangdong (CN); Zijiang Ma, Guangdong (CN); Yong Lv, Guangdong (CN); Chen Lu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 4 days.

(21) Appl. No.: 15/739,404

(22) PCT Filed: Apr. 21, 2016

(86) PCT No.: PCT/CN2016/079921
§ 371 (c)(1),
(2) Date: Dec. 22, 2017

(87) PCT Pub. No.: WO2016/206462
PCT Pub. Date: Dec. 29, 2016

(65) Prior Publication Data
US 2018/0176750 A1 Jun. 21, 2018

(30) Foreign Application Priority Data
Jun. 26, 2015 (CN) .......................... 2015 1 0366038

(51) Int. Cl.
*H04W 4/44* (2018.01)
*H04W 4/46* (2018.01)
(Continued)

(52) U.S. Cl.
CPC .............. *H04W 4/44* (2018.02); *H04L 29/08* (2013.01); *H04L 67/12* (2013.01); *H04W 4/027* (2013.01);
(Continued)

(58) Field of Classification Search
CPC combination set(s) only.
See application file for complete search history.

(56) References Cited

U.S. PATENT DOCUMENTS

| 2008/0095134 A1* | 4/2008 | Chen .................... H04B 7/2606 370/342 |
| 2009/0285197 A1 | 11/2009 | Chen et al. |

(Continued)

FOREIGN PATENT DOCUMENTS

| CN | 101573994 A | 11/2009 |
| CN | 103501543 A | 1/2014 |

(Continued)

OTHER PUBLICATIONS

European Extended Supplementary Search Report dated Mar. 6, 2018 received in European Patent Application No. 16 81 3578.8.

(Continued)

*Primary Examiner* — Hong S Cho
(74) *Attorney, Agent, or Firm* — Li & Cai Intellectual Property (USA) Office

(57) ABSTRACT

A vehicle group management method is provided. In a coverage area of a Road Side Unit, it is determined by the RSU or a designated vehicle whether state information of a plurality of vehicle groups meets a first preset condition for integrating the vehicle groups or a second preset condition for splitting the vehicle groups. The designated vehicle has a management right for managing the vehicle groups. If the determination result is yes, the vehicle groups are integrated according to the first preset condition, or the vehicle groups are splitted according to the second preset condition. Additionally, a vehicle in the integrated vehicle groups or the split vehicle groups is designated as the designated vehicle.

13 Claims, 8 Drawing Sheets

In a coverage area of a Road Side Unit (RSU), determine, by the RSU and/or a designated vehicle in a plurality of vehicle groups, whether state information of the plurality of vehicle groups meets a first preset condition for integrating the plurality of vehicle groups and/or a second preset condition for splitting the plurality of vehicle groups — 302

If the determination result is yes, integrate, by the RSU and/or the designated vehicle in the plurality of vehicle groups, the plurality of vehicle groups according to the first preset condition, and/or split, by the RSU and/or the designated vehicle in the plurality of vehicle groups, the vehicle groups according to the second preset condition — 304

Designate, by the RSU, a vehicle in the integrated vehicle groups and/or split vehicle groups as the designated vehicle — 306

(51) Int. Cl.
*H04L 29/08* (2006.01)
*H04W 4/02* (2018.01)
*H04W 4/38* (2018.01)
*H04W 72/04* (2009.01)

(52) U.S. Cl.
CPC .............. *H04W 4/38* (2018.02); *H04W 4/46* (2018.02); *H04W 72/048* (2013.01)

(56) References Cited

U.S. PATENT DOCUMENTS

| | | | |
|---|---|---|---|
| 2013/0179056 A1 | 7/2013 | Fukuyama | |
| 2014/0222971 A1* | 8/2014 | Cooper | H04L 67/12 709/219 |
| 2014/0302774 A1* | 10/2014 | Burke | G07C 5/08 455/3.05 |
| 2015/0254987 A1* | 9/2015 | Altintas | H04W 4/029 701/409 |
| 2016/0232791 A1* | 8/2016 | Tosa | G08G 1/096741 |

FOREIGN PATENT DOCUMENTS

| | | |
|---|---|---|
| CN | 104115527 A | 10/2014 |
| CN | 104639627 A | 5/2015 |

OTHER PUBLICATIONS

International Search Report dated Jul. 11, 2016 issued in PCT/CN2016/079921.

\* cited by examiner

In a coverage area of a Road Side Unit (RSU), determine, by the RSU and/or a designated vehicle in a plurality of vehicle groups, whether state information of the plurality of vehicle groups meets a first preset condition for integrating the plurality of vehicle groups and/or a second preset condition for splitting the plurality of vehicle groups ⟋ 302

If the determination result is yes, integrate, by the RSU and/or the designated vehicle in the plurality of vehicle groups, the plurality of vehicle groups according to the first preset condition, and/or split, by the RSU and/or the designated vehicle in the plurality of vehicle groups, the vehicle groups according to the second preset condition ⟋ 304

Designate, by the RSU, a vehicle in the integrated vehicle groups and/or split vehicle groups as the designated vehicle ⟋ 306

Fig. 3

Outside a coverage area of a Road Side Unit (RSU), determine, by a designated vehicle in a plurality of vehicle groups, whether state information of the plurality of vehicle groups meets a first preset condition for integrating the plurality of vehicle groups and/or a second preset condition for splitting the plurality of vehicle groups ⟋ 402

If the determination result is yes, integrate, by the designated vehicle, the plurality of vehicle groups according to the first preset condition, and/or split, by the designated vehicle, the vehicle groups according to the second preset condition ⟋ 404

Determine a vehicle in the integrated vehicle groups and/or split vehicle groups as the designated vehicle according to negotiation between designated vehicles before integration and/or split of the vehicle groups, or according to a predefined rule ⟋ 406

Fig. 4

METHOD AND APPARATUS FOR MANAGING VEHICLE GROUPS IN INTERNET OF VEHICLES

CROSS-REFERENCE TO RELATED APPLICATION

This application is based upon and claims priority to PCT Application No. PCT/CN2016/079921, filed Apr. 21, 2016, which is based upon and claims priority to Chinese Patent Application No. 201510366038.5, filed Jun. 26, 2015, the entire contents of which are incorporated herein by reference.

TECHNICAL FIELD

The present disclosure relates to the communication technical field, and more particularly to a vehicle group management method and device in a Vehicle to Everything (V2X) system.

BACKGROUND

With rapid economic and social developments, dramatic growth of automobile ownership in China and frequent road traffic accidents have become one of the important factors that have an impact on the public security in our country in recent years. The road traffic safety has become one of basic issues affecting social harmony and improving people's livelihood. China urgently needs to improve traffic safety from the aspects of technology, policy and education, among which the promotion of vehicle safety and design is an important part.

The technologies for enhancing vehicle safety are mainly divided into passive safety technologies and active safety technologies. Passive safety technologies are used to protect goods and people inside and outside of vehicles after an accident. Active safety technologies are used to prevent and reduce vehicle accidents and avoid damages to people. The active safety technologies are the focus and trend of modern vehicle safety technology development.

Collision warning system based on communication realizes real-time information interactions between vehicles and between vehicles and roadside infrastructures by using advanced wireless communication technologies and new-generation information processing technologies. The collision warning system notifies each vehicle of the current status (including the positions, speeds, accelerations, and driving routes of vehicles) and the obtained information of road environment, senses dangerous situations on roads in a cooperation manner, and provides various kinds of collision warning information in time to prevent occurrence of road traffic safety accidents. Thus, the collision warning system becomes a new idea of trying to solve the road traffic safety problems in various countries at present.

FIG. 1 is a schematic diagram illustratively showing sending of traffic and scheduling information from a network information platform to vehicles in related arts, and FIG. 2 is a schematic diagram illustratively showing architecture of a LTE-based vehicle network in related arts. Referring to FIGS. 1 and 2, Vehicle to Everything (V2X) refers to providing vehicle information through sensors mounted on vehicles, vehicle-mounted terminals and electronic tags, and realizing communications and connections, such as V2V (Vehicle to Vehicle), V2P (Vehicle to Personal), V2I (Vehicle to Infrastructure), and effectively utilizing information (for example, extracting and sharing information) on the information network platform to effectively control vehicles and provide integrated services.

In recent years, with the development of new mobile communication technologies, there has been an international study that uses Long Term Evolution (LTE) technology to solve the problem of communication applications in V2X system. A Road Side Unit (RSU) can receive vehicle requests to ensure that vehicles access the Internet and can serve as a gateway. In addition, the RSU also has functions such as computation, storage, and forwarding of data.

The communications between Vehicles and Road Side Unit (V2RSU), also known as V2I, include the following features:

(1) When the RSU broadcasts information, the broadcast information is sent only to all vehicles within its coverage.

(2) One-hop transmission exists between the RSU and vehicles to prevent adverse impacts caused by multi-hop transmissions, such as low success rate of packet delivery, and low network throughput.

(3) The RSU can quickly receive and detect the passing vehicles, traffic lights and some traffic information, and process, re-rank and reselect the information and then send the information to the vehicles.

The above three aspects ensure that when vehicles pass the RSU, the vehicles can access the Internet or download the data stored in the RSU reliably and in real time by establishing connections with the RSU.

In order to realize V2V communication, each vehicle supporting V2V communication needs resources (such as frequency and timeslots and other physical resources for communication) required for communication. When V2V communication adopts the D2D technology defined by 3GPP, the resources required by V2V communication can be obtained by competition, for example, first get first use, but this approach may cause congestion and collision of resources in an area where there are a large number of vehicles. For example, there is a resource block allocated in advance, and if a plurality of vehicles use the same resource (for example, the same frequency resource and timeslot resource), all the vehicles cannot use the resource, and as a result, the information of these vehicles cannot be sent. Therefore, in the V2V communication, if the vehicles obtain resources in the resource pool by competition, collision is easy to occur and thereby vehicle information cannot be sent in time.

It can be seen from the above that in the related arts, when a network allocates resources to a plurality of vehicle groups (that is, fleets in a vehicle network) in a vehicle-intensive area, because cells change due to high speed moving of vehicle groups, it is difficult for the network to allocate and release resources for these vehicle groups in time. For such problem in related arts, there is no effective solution at present.

This section provides background information related to the present disclosure which is not necessarily prior art.

SUMMARY

The following is a summary of the subject matters which will be described in detail below. The summary is not intended to limit the scope as defined by claims.

Embodiments of the present disclosure provide a vehicle group management method and device in a V2X system, which are capable of solving the problem in related arts that when there are a plurality of vehicle groups, it is hard to allocate and release resources for each vehicle group.

According to an aspect of embodiments of the present disclosure, there is provide a vehicle group management method in a V2X system. The method includes the follows steps. In a coverage area of a Road Side Unit (RSU), the RSU and/or a designated vehicle in a plurality of vehicle groups determines whether state information of the plurality of vehicle groups meets a first preset condition for integrating the plurality of vehicle groups and/or a second preset condition for splitting the plurality of vehicle groups. The designated vehicle has a management right for managing the vehicle groups. If it is determined that the state information of the plurality of vehicle groups meets the first preset condition for integrating the plurality of vehicle groups and/or the second preset condition for splitting the plurality of vehicle groups, the RSU and/or the designated vehicle in the plurality of vehicle groups integrates the plurality of vehicle groups according to the first preset condition, and/or split the plurality of vehicle groups according to the second preset condition. The RSU designates a vehicle in the integrated vehicle groups and/or split vehicle groups as the designated vehicle.

According to an exemplary embodiment, the state information includes at least one of driving directions of the vehicle groups, driving speeds of the vehicle groups, intervals between the vehicle groups, indication information of a vehicle for managing the vehicle groups, and V2X services.

According to an exemplary embodiment, the first preset condition includes that driving directions of the plurality of vehicle groups are consistent, that driving speeds of vehicles in the plurality of vehicle groups are within a first preset range, intervals between the plurality of vehicle groups are within a second preset range, integration indication information, and the same V2X services. The second preset condition includes that driving directions of vehicles in the plurality of vehicle groups are not consistent, that driving speeds of vehicles in the plurality of vehicle groups are not within the first preset range, intervals between the plurality of vehicle groups are not within the second preset range, split indication information, and different V2X services.

According to an exemplary embodiment, the method further includes the following step. The designated vehicle in the integrated vehicle groups and/or the split vehicle groups sends broadcast information which is periodically sent. The broadcast information includes at least one of identities of the vehicle groups, an identity of the designated vehicle, a resource pool, identities of vehicles in the vehicle groups, services of the vehicle groups, driving speeds of the vehicle groups, and driving directions of the vehicle groups.

According to an exemplary embodiment, the method further includes the following steps. The designated vehicle in the integrated vehicle groups and/or the split vehicle groups or the RSU notifies vehicles that leaves the vehicle groups and/vehicles that remain in the vehicle groups of identities of vehicles in the vehicle groups and an identity of the designated vehicle. The RSU allocates a wireless resource pool for the integrated vehicle groups and/or the split vehicle groups and notifying the designated vehicle of the allocated wireless resource pool.

According to another aspect of embodiments of the present disclosure, there is provided a vehicle group management method in a V2X system. The method includes the following steps. Outside a coverage area of a Road Side Unit (RSU), a designated vehicle in a plurality of vehicle groups determines whether state information of the plurality of vehicle groups meets a first preset condition for integrating the plurality of vehicle groups and/or a second preset condition for splitting the plurality of vehicle groups. The designated vehicle has a management right for managing the vehicle groups. If it is determined that the state information of the plurality of vehicle groups meets the first preset condition for integrating the plurality of vehicle groups and/or the second preset condition for splitting the plurality of vehicle groups, the designated vehicle integrates the plurality of vehicle groups according to the first preset condition, and/or split the plurality of vehicle groups according to the second preset condition. A vehicle in the integrated vehicle groups and/or split vehicle groups is determined as the designated vehicle according to negotiation between designated vehicles before integration and/or split of the vehicle groups, or according to a predefined rule.

According to an exemplary embodiment, the state information includes at least one of driving directions of the vehicle groups, driving speeds of the vehicle groups, intervals between the vehicle groups, indication information of a vehicle for managing the vehicle groups, and V2X services.

According to an exemplary embodiment, the first preset condition includes that driving directions of in the plurality of vehicle groups are consistent, that driving speeds of vehicles in the plurality of vehicle groups are within a first preset range, intervals between the plurality of vehicle groups are within a second preset range, integration indication information, and the same V2X services. The second preset condition includes that driving directions of vehicles in the plurality of vehicle groups are not consistent, that driving speeds of vehicles in the plurality of vehicle groups are not within the first preset range, intervals between the plurality of vehicle groups are not within the second preset range.

According to an exemplary embodiment, the method further includes the following step. The designated vehicle in the integrated vehicle groups and/or the split vehicle groups sends broadcast information which is periodically sent. The broadcast information includes at least one of identities of the vehicle groups, an identity of the designated vehicle, a resource pool, identities of vehicles in the vehicle groups, services of the vehicle groups, driving speeds of the vehicle groups, driving directions of the vehicle groups, split indication information and different V2X services.

According to an exemplary embodiment, the method further includes the following steps. The designated vehicle in the integrated vehicle groups and/or the split vehicle groups or the RSU notifies vehicles that leaves the vehicle groups and/vehicles that remain in the vehicle groups of identities of vehicles in the vehicle groups and an identity of the designated vehicle. The integrated vehicle groups and/or split vehicle groups employ a negotiated or pre-configured wireless resource.

According to another aspect of embodiments of the present disclosure, there is provided a vehicle group management device in a V2X system, applied in a Road Side Unit (RSU) and/or a designated vehicle side in a plurality of vehicle groups. The device includes includes a processor and a memory. The memory stores instructions executable by the processor. The processor is configured to, in a coverage area of the RSU, determine whether state information of the plurality of vehicle groups meets a first preset condition for integrating the plurality of vehicle groups and/or a second preset condition for splitting the plurality of vehicle groups. The processor is configured to, if it is determined that the state information of the plurality of vehicle groups meets the first preset condition for integrating the plurality of vehicle groups and/or the second preset condition for splitting the plurality of vehicle groups, integrate the plurality of vehicle groups according to the first preset condition, and/or split the plurality of vehicle groups according to the second preset condition. The processor is configured to designate a vehicle in the integrated vehicle groups and/or split vehicle groups as the designated vehicle.

According to another aspect of embodiments of the present disclosure, there is provided a vehicle group management device in a V2X system, applied in a designated vehicle side in a plurality of vehicle groups. The device includes a processor and a memory. The memory stores instructions executable by the processor. The processor is configured to, outside a coverage area of the RSU, determine whether state information of the plurality of vehicle groups meets a first preset condition for integrating the plurality of vehicle groups and/or a second preset condition for splitting the plurality of vehicle groups. The designated vehicle has a management right for managing the vehicle groups. The processor is configured to, if it is determined that the state information of the plurality of vehicle groups meets the first preset condition for integrating the plurality of vehicle groups and/or the second preset condition for splitting the plurality of vehicle groups, integrate the plurality of vehicle groups according to the first preset condition, and/or split the plurality of vehicle groups according to the second preset condition. The processor is configured to determine a vehicle in the integrated vehicle groups and/or split vehicle groups as the designated vehicle according to negotiation, or according to a predefined rule.

According to another aspect of embodiments of the present disclosure, there is provided a computer-readable storage medium for storing computer executable instructions, which are configured to perform any one of the vehicle group management methods.

According to embodiments of the present disclosure, in a coverage area of a Road Side Unit (RSU), the RSU or a designated vehicle in a plurality of vehicle groups integrates a plurality of vehicle groups which meet a first preset condition, and splits vehicle groups which meet a second preset condition. Then, for the integrated vehicle groups and/or split vehicle groups, the RSU designates a vehicle in the integrated vehicle groups and/or the split vehicle groups as a designated vehicle, or designated vehicles before the integration and/or split determine the designated vehicle in the integrated vehicle groups and/or split vehicle groups by negotiation. By integrating and/or splitting the vehicle groups in a V2X system according to embodiments of the present disclosure, management of a plurality of vehicle groups is realized, and thus the present disclosure can solve the problem in related arts that when there are a plurality of vehicle groups, it is hard to allocate and release resources for each vehicle group.

Other features and advantages of embodiments of the present disclosure will be set forth in the following description, and will be in part obvious from the description, or may be learned by practice of the present disclosure. The objectives and other advantages of the present disclosure may be realized and attained by the structure particularly pointed out in the description and claims as well as the drawings.

Other aspects will become apparent upon reading and understanding the drawings and detailed description.

This section provides a summary of various implementations or examples of the technology described in the disclosure, and is not a comprehensive disclosure of the full scope or all features of the disclosed technology.

BRIEF DESCRIPTION OF THE DRAWINGS

The drawings described herein, which constitute a part of the present disclosure, are used to provide a further understanding of the present disclosure. The exemplary embodiments and the descriptions thereof are used to explain the present disclosure and are not intended to unduly limit the present disclosure.

FIG. 3 is a flow chart illustratively showing a vehicle group management method in a V2X system according to an embodiment of the present disclosure.

FIG. 4 is a flow chart illustratively showing a vehicle group management method in a V2X system according to another embodiment of the present disclosure.

DETAILED DESCRIPTION

Figure 1:
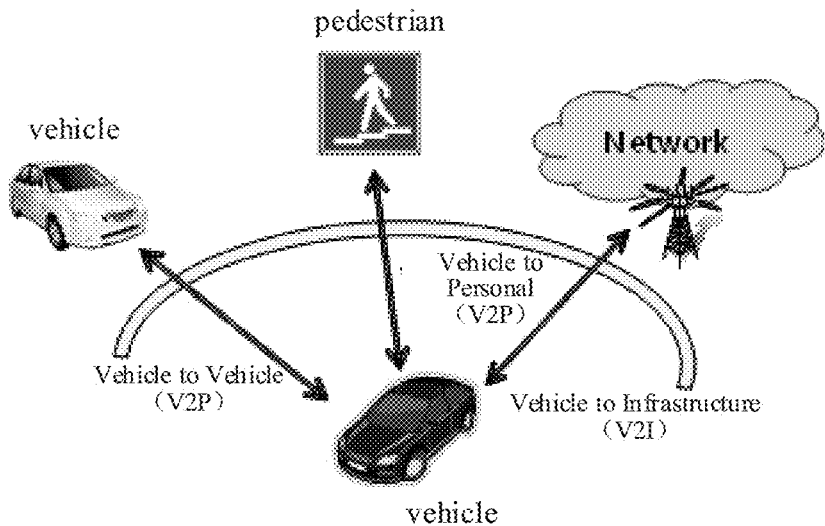
FIG. 1 is a schematic diagram illustratively showing sending of traffic and scheduling information from a network information platform to vehicles in related arts.
Figure 2:
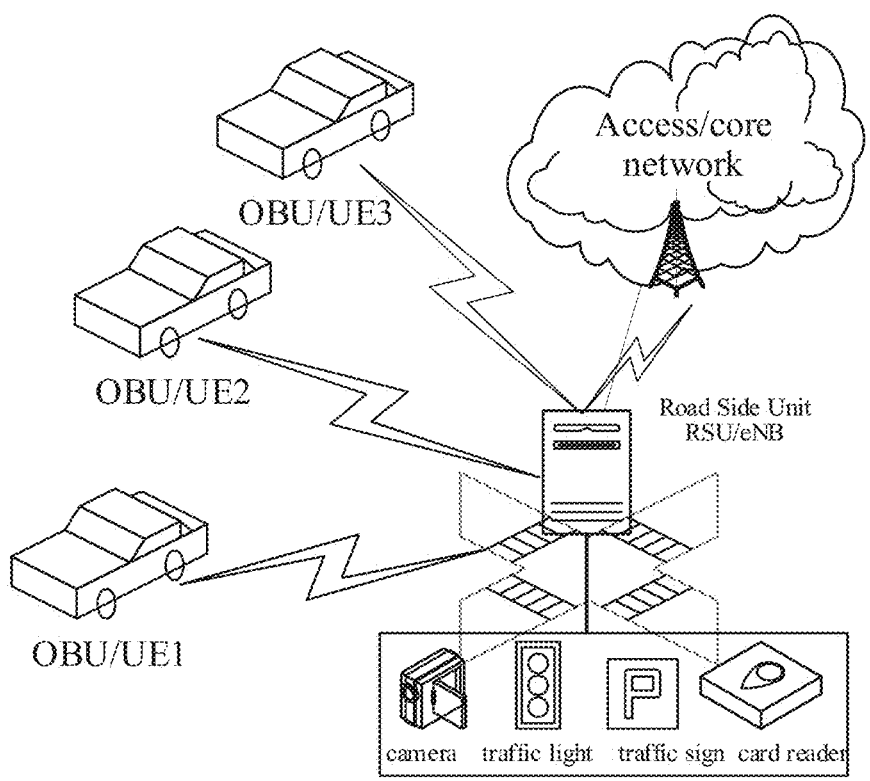
FIG. 2 is a schematic diagram illustratively showing architecture of a LTE-based vehicle network in related arts.

Hereinafter, the present disclosure will be described in detail with reference to the accompanying drawings and embodiments. It should be noted that, in the case of no conflict, the embodiments in the present disclosure and the features in the embodiments may be combined with each other.

It should be noted that the terms "first", "second" and the like in the description and claims of the present disclosure as well as the above drawings are used to distinguish similar objects, and are not necessarily used to describe a specific sequence or order.

An embodiment of the present disclosure provides a vehicle group management method in a V2X system. FIG. 3 is a flow chart illustratively showing a vehicle group management method in a V2X system according to an embodiment of the present disclosure. As shown in FIG. 3, the method may include the following steps.

In step 302, in a coverage area of an RSU, the RSU and/or a designated vehicle in a plurality of vehicle groups determines whether state information of the plurality of vehicle groups meets a first preset condition for integrating the plurality of vehicle groups and/or a second preset condition for splitting the plurality of vehicle groups. The designated vehicle has a management right for managing the vehicle groups.

In step 304, if it is determined that the state information of the plurality of vehicle groups meets the first preset condition for integrating the plurality of vehicle groups and/or the second preset condition for splitting the plurality of vehicle groups, the RSU and/or the designated vehicle in the plurality of vehicle groups integrates the plurality of vehicle groups according to the first preset condition, and/or the RSU and/or the designated vehicle in the plurality of vehicle groups splits the plurality of vehicle groups according to the second preset condition.

In step 306, the RSU designates a vehicle in the integrated vehicle groups and/or split vehicle groups as the designated vehicle.

By the steps 302 to 306 of the present embodiment, in a coverage area of an RSU, the RSU or a designated vehicle in a plurality of vehicle groups integrates a plurality of vehicle groups which meet a first preset condition, and splits vehicle groups which meet a second preset condition. Then, for the integrated vehicle groups and/or split vehicle groups, the RSU designates a vehicle in the integrated vehicle groups and/or the split vehicle groups as a designated vehicle, or designated vehicles before the integration and/or split determine the designated vehicle in the integrated vehicle groups and/or split vehicle groups by negotiation. By integrating and/or splitting the vehicle groups in a V2X system according to the embodiment of the present disclosure, management of a plurality of vehicle groups is realized, and thus the present disclosure can solve the problem in related arts that when there are a plurality of vehicle groups, it is hard to allocate and release resources for each vehicle group.

A predefined rule involved in embodiments of the present disclosure may be that a vehicle having the smallest ID may be selected as a designated vehicle. Rather, this is only an exemplary implementation, and alternatively a vehicle having the strongest device capability or having the most optimal quality information of vehicle devices may be selected as a designated vehicle. It should be noted that these implementations are not intended to limit the scope of the present disclosure.

In an embodiment, the state information includes at least one of driving directions of the vehicle groups, driving speeds of the vehicle groups, intervals between the vehicle groups, and indication information of a vehicle for managing the vehicle groups. It should be noted that in addition to the above information, the state information may further include strategies of operators/business traders. That is to say, the state information in the embodiment may be properly adjusted according to actual needs and is not limited to the above stated information. Lead vehicle indication information refers to that a lead vehicle sends integration request information to the RSU. The strategies of operators/business traders refer to that the operators/business traders request for integration.

In an exemplary embodiment, the first preset condition for integrating vehicle groups may be one or more of the following conditions: driving directions of vehicles in the plurality of vehicle groups are consistent, driving speeds of vehicles in the plurality of vehicle groups are within a first preset range, intervals between the plurality of vehicle groups are within a second preset range, integration indication information, and the same V2X services (in other words, the services of vehicle groups in the V2X system are the same). The second preset condition for splitting vehicle groups may be one or more of the following conditions: driving directions of vehicles in the plurality of vehicle groups are not consistent, driving speeds of vehicles in the plurality of vehicle groups are not within the first preset range, intervals between the plurality of vehicle groups are not within the second preset range, split indication information, and different V2X services. It should be noted that the first preset condition and second preset condition are all exemplary implementations and are not intended to limit scope of the present disclosure. Other preset conditions may be added according to actual application scenarios.

In another exemplary embodiment, after integration and/or split of the vehicle groups, the method may further include sending, by the designated vehicle in the integrated vehicle groups and/or the split vehicle groups, broadcast information which is periodically sent. The broadcast information includes at least one of identities of the vehicle groups, an identity of the designated vehicle, a resource pool, identities of vehicles in the vehicle groups, services of the vehicle groups, driving speeds of the vehicle groups, and driving directions of the vehicle groups. By the information broadcast by the designated vehicle, the integrated vehicle groups and/or split vehicle groups may re-form a new vehicle group quickly, so that management of the integrated vehicle groups and/or split vehicle groups can be realized.

In another exemplary embodiment, after integration and/or split of vehicle groups, the method may further include the following steps.

In step 11, the designated vehicle in the integrated vehicle groups and/or the split vehicle groups or the RSU notifies vehicles that leaves the vehicle groups and/vehicles that remain in the vehicle groups of identities of vehicles in the vehicle groups and an identity of the designated vehicle.

In step 12, the RSU allocates a wireless resource pool for the integrated vehicle groups and/or the split vehicle groups and notifies the designated vehicle of the allocated wireless resource pool.

FIG. 4 is a flow chart illustratively showing a vehicle group management method in a V2X system according to another embodiment of the present disclosure. As shown in FIG. 4, the method may include the following steps.

In step 402, outside a coverage area of a Road Side Unit (RSU), a designated vehicle in a plurality of vehicle groups determines whether state information of the plurality of vehicle groups meets a first preset condition for integrating the plurality of vehicle groups and/or a second preset condition for splitting the plurality of vehicle groups. The designated vehicle has a management right for managing the vehicle groups.

In step 404, if it is determined that the state information of the plurality of vehicle groups meets the first preset condition for integrating the plurality of vehicle groups and/or the second preset condition for splitting the plurality of vehicle groups, the designated vehicle integrates the plurality of vehicle groups according to the first preset condition, and/or splits the plurality of vehicle groups according to the second preset condition.

In step 406, a vehicle in the integrated vehicle groups and/or split vehicle groups is determined as the designated vehicle according to negotiation between designated vehicles before integration and/or split of the vehicle groups, or according to a predefined rule.

The state information involved in embodiments of the present disclosure includes at least one of driving directions of the vehicle groups, driving speeds of the vehicle groups, intervals between the vehicle groups, indication information of a vehicle for managing the vehicle groups. It should be noted that in addition to the above information, the state information may further include strategies of operators/business traders. That is to say, the state information in the embodiment may be properly adjusted according to actual needs and is not limited to the above stated information. Lead vehicle indication information refers to that a lead vehicle sends integration request information to the RSU. The strategies of operators/business traders refer to that the operators/business traders request for integration.

In an exemplary embodiment, the first preset condition for integrating vehicle groups may be one or more of the following conditions: driving directions of vehicles in the plurality of vehicle groups are consistent, driving speeds of vehicles in the plurality of vehicle groups are within a first preset range, intervals between the plurality of vehicle groups are within a second preset range. The second preset condition for splitting vehicle groups may be one or more of the following conditions: driving directions of vehicles in the plurality of vehicle groups are not consistent, that driving speeds of vehicles in the plurality of vehicle groups are not within the first preset range, intervals between the plurality of vehicle groups are not within the second preset range. It should be noted that the first preset condition and second preset condition are all exemplary implementations and are not intended to limit scope of the present disclosure. Other preset conditions may be added according to actual application scenarios.

In another exemplary embodiment, after integration and/or split of the vehicle groups, the method may further include sending, by the designated vehicle in the integrated vehicle groups and/or the split vehicle groups, broadcast information which is periodically sent. The broadcast information includes at least one of identities of the vehicle groups, an identity of the designated vehicle, a resource pool, identities of vehicles in the vehicle groups, services of the vehicle groups, driving speeds of the vehicle groups, and driving directions of the vehicle groups. By the information broadcast by the designated vehicle, the integrated vehicle groups and/or split vehicle groups may re-form a new vehicle group quickly, so that management of the integrated vehicle groups and/or split vehicle groups can be realized.

In another exemplary embodiment, after integration and/or split of vehicle groups, the method may further include the following steps.

In step 21, the designated vehicle in the integrated vehicle groups and/or the split vehicle groups or the RSU notifies vehicles that leaves the vehicle groups and/vehicles that remain in the vehicle groups of identities of vehicles in the vehicle groups and an identity of the designated vehicle.

In step 22, the integrated vehicle groups and/or split vehicle groups employ a negotiated or pre-configured wireless resource.

Through the above description of the embodiments, those skilled in the art can clearly understand that the methods according to the above embodiments may be implemented by software plus a necessary general hardware platform, or may be implemented by hardware. However, in many cases, the former is better. Based on this understanding, the essence of the present disclosure (or in other words, the portion of the present disclosure which contributes over prior arts) can be embodied in a form of software product. The computer software product is stored in a storage medium (such as a ROM/RAM, a magnetic disk, an optical disc and so on), and instructions are included in the software product to enable a terminal device (which may be a mobile phone, a computer, a server, or a network device, and so on) to execute the methods according to the embodiments of the disclosure.

Embodiments of the present disclosure also provide a storage medium for storing computer executable instructions, which are configured to perform any one of the vehicle group management method in a V2X system.

An embodiment of the present disclosure further provides a vehicle group management device in a V2X system. The device is used to implement the above (exemplary) embodiments and detailed descriptions will not be repeated here. As used herein, the term "module" may refer to a combination of hardware and/or software for realizing a preset function. Although the devices described in the following embodiments are preferably implemented in software, the implementation of hardware, or a combination of software and hardware, is also possible and can be conceived.

Figure 5:
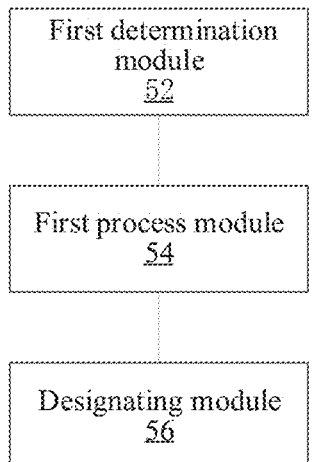
FIG. 5 is a block diagram illustratively showing a structure of a vehicle group management device in a V2X system according to another embodiment of the present disclosure.

FIG. 5 is a block diagram illustratively showing a structure of a vehicle group management device in a V2X system according to another embodiment of the present disclosure. The device is applied in an RSU and/or a designated vehicle side in vehicle groups. As shown in FIG. 5, the device includes a first determination module 52, a first process module 54 and a designating module 56. The first determination module 52 is configured to, in a coverage area of the RSU, determine whether state information of the plurality of vehicle groups in the coverage meets a first preset condition for integrating the plurality of vehicle groups and/or a second preset condition for splitting the plurality of vehicle groups. The designated vehicle has a management right for managing the vehicle groups. The first process module 54, coupled to the first determination module 52, is configured to, if it is determined that the state information of the plurality of vehicle groups meets the first preset condition for integrating the plurality of vehicle groups and/or the second preset condition for splitting the plurality of vehicle groups, in a coverage area of the RSU, integrate the plurality of vehicle groups according to the first preset condition, and/or split the plurality of vehicle groups according to the second preset condition. The designating module 56, coupled to the first process module 54, is configured to designate a vehicle in the integrated vehicle groups and/or split vehicle groups as the designated vehicle in the coverage area of the RSU.

According to an exemplary embodiment, the state information includes at least one of driving directions of the vehicle groups, driving speeds of the vehicle groups, intervals between the vehicle groups, indication information of a vehicle for managing the vehicle groups.

According to an exemplary embodiment, the first preset condition includes that driving directions of the plurality of vehicle groups are consistent, that driving speeds of vehicles in the plurality of vehicle groups are within a first preset range, intervals between the plurality of vehicle groups are within a second preset range. The second preset condition includes that driving directions of vehicles in the plurality of vehicle groups are not consistent, that driving speeds of vehicles in the plurality of vehicle groups are not within the first preset range, intervals between the plurality of vehicle groups are not within the second preset range.

Figure 6:
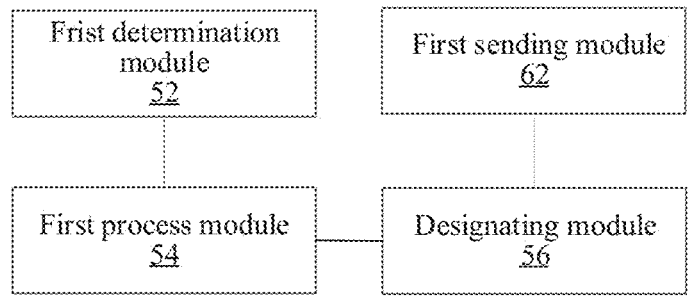
FIG. 6 is a block diagram illustratively showing an optional structure of a vehicle group management device in a V2X system according to another embodiment of the present disclosure.

FIG. 6 is a block diagram illustratively showing an optional structure of a vehicle group management device in a V2X system according to another embodiment of the present disclosure. As shown in FIG. 6, the device includes a first sending module 62 which is coupled to the designating module 56. The sending module 62 is configured to send, by the designated vehicle in the integrated vehicle groups and/or the split vehicle groups, broadcast information which is periodically sent. The broadcast information includes at least one of identities of the vehicle groups, an identity of the designated vehicle, a resource pool, identities of vehicles in the vehicle groups, services of the vehicle groups, driving speeds of the vehicle groups, and driving directions of the vehicle groups.

Figure 7:
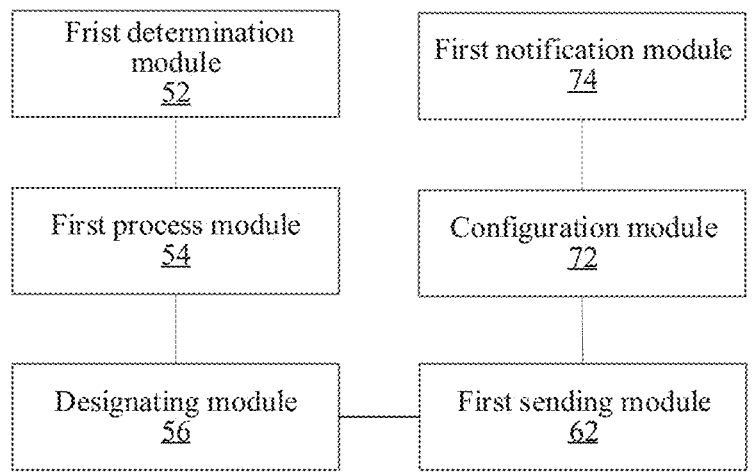
FIG. 7 is a block diagram illustratively showing an optional structure of a vehicle group management device in a V2X system according to another embodiment of the present disclosure.

FIG. 7 is a block diagram illustratively showing an optional structure of a vehicle group management device in a V2X system according to another embodiment of the present disclosure. As shown in FIG. 7, the device further includes a first notification module 72 and a configuration module 74. The first notification module 72, coupled to the first sending module 62, is configured to notify, by the designated vehicle in the integrated vehicle groups and/or the split vehicle groups or the RSU, vehicles that leaves the vehicle groups and/vehicles that remain in the vehicle groups of identities of vehicles in the vehicle groups and an identity of the designated vehicle. The configuration module 74, coupled to the first notification module 72, is configured to re-allocate, by the RSU, a wireless resource pool for the split vehicle groups in the coverage area and notify the designated vehicle of the re-allocated wireless resource pool.

It should be noted that the above embodiments described with respect to FIGS. 5-7 are for the application scenario within the coverage of the RSU. The embodiments for the application scenario outside the RSU will be described below.

Figure 8:
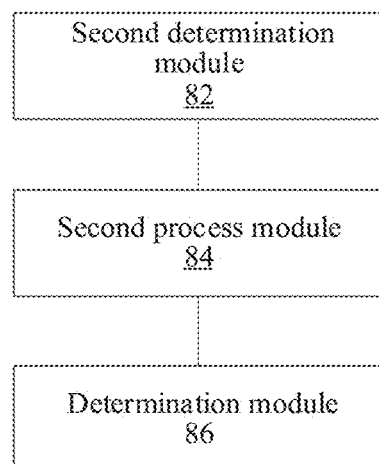
FIG. 8 is a block diagram illustratively showing a structure of a vehicle group management device in a V2X system according to another embodiment of the present disclosure.

FIG. 8 is a block diagram illustratively showing a structure of a vehicle group management device in a V2X system according to another embodiment of the present disclosure. As shown in FIG. 8, the device includes a second determination module 82, a second process module 84 and a determination module 86. The second determination module 82 is configured to, outside a coverage area of the RSU, determine by a designated vehicle in a plurality of vehicle groups whether state information of the plurality of vehicle groups meets a first preset condition for integrating the plurality of vehicle groups and/or a second preset condition for splitting the plurality of vehicle groups. The designated vehicle has a management right for managing the vehicle groups. The second process module 84, coupled to the second determination module 82, is configured to, if it is determined that the state information of the plurality of vehicle groups meets the first preset condition for integrating the plurality of vehicle groups and/or the second preset condition for splitting the plurality of vehicle groups, integrate the plurality of vehicle groups according to the first preset condition, and/or split the plurality of vehicle groups according to the second preset condition by the designated vehicle. The determination module 86, coupled to the second process module 84, is configured to determine a vehicle in the integrated vehicle groups and/or split vehicle groups as the designated vehicle according to negotiation between designated vehicles before the integration and/or split, or according to a predefined rule.

According to an exemplary embodiment, the state information includes at least one of driving directions of the vehicle groups, driving speeds of the vehicle groups, intervals between the vehicle groups, indication information of a vehicle for managing the vehicle groups.

According to an exemplary embodiment, the first preset condition includes that driving directions of the plurality of vehicle groups are consistent, that driving speeds of vehicles in the plurality of vehicle groups are within a first preset range, intervals between the plurality of vehicle groups are within a second preset range. The second preset condition includes that driving directions of vehicles in the plurality of vehicle groups are not consistent, that driving speeds of vehicles in the plurality of vehicle groups are not within the first preset range, intervals between the plurality of vehicle groups are not within the second preset range.

Figure 9:
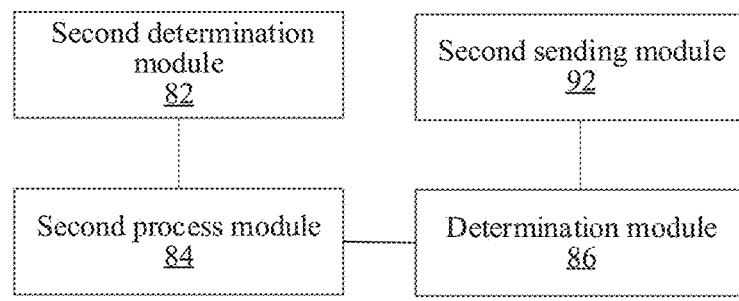
FIG. 9 is a block diagram illustratively showing an optional structure of a vehicle group management device in a V2X system according to another embodiment of the present disclosure.

FIG. 9 is a block diagram illustratively showing an optional structure of a vehicle group management device in a V2X system according to another embodiment of the present disclosure. As shown in FIG. 9, the device includes a second sending module 92, which is coupled to the determination module 86. The second sending module 92 is configured to send, by the designated vehicle in the integrated vehicle groups and/or the split vehicle groups, broadcast information which is periodically sent. The broadcast information includes at least one of identities of the vehicle groups, an identity of the designated vehicle, a resource pool, identities of vehicles in the vehicle groups, services of the vehicle groups, driving speeds of the vehicle groups, and driving directions of the vehicle groups.

Figure 10:
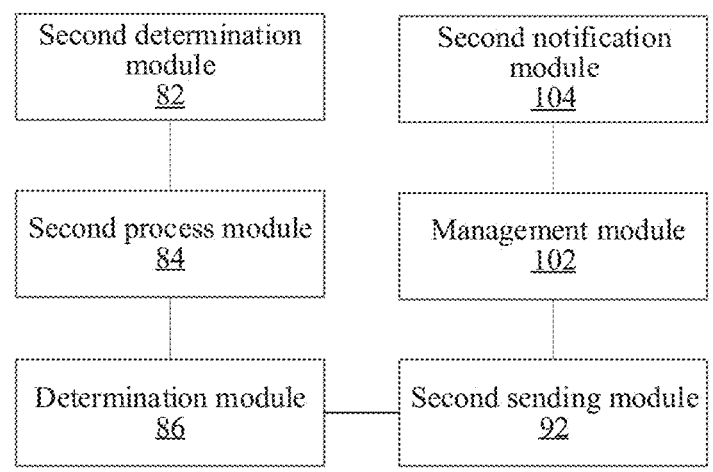
FIG. 10 is a block diagram illustratively showing an optional structure of a vehicle group management device in a V2X system according to another embodiment of the present disclosure.

FIG. 10 is a block diagram illustratively showing an optional structure of a vehicle group management device in a V2X system according to another embodiment of the present disclosure. As shown in FIG. 10, the device includes a second notification module 102 and a management module 104. The second notification module 102, coupled to the second sending module 92, is configured to notify vehicles that leaves the vehicle groups and/vehicles that remain in the vehicle groups of identities of vehicles in the vehicle groups and an identity of the designated vehicle. The management module 104, coupled to the second notification module 102, is configured to employ a wireless resource which is determined according to negotiation between the split vehicle groups or pre-configured.

The present disclosure will be described with reference to the following exemplary embodiments.

An exemplary embodiment of the present disclosure provides a V2X communication-based fleet management method. The method includes the following steps. In a coverage area of a Road Side Unit (RSU), when the RSU decides to integrate two or more fleets (corresponding to "vehicle groups" as mentioned in the above embodiments) in a V2X system (or a V2X network) into one fleet or the RSU decides to split one fleet, the RSU determines the lead vehicle (corresponding to the "designated vehicle" as mentioned in the above embodiments) in the integrated or split fleets. Outside the coverage area of the RSU, if two or more fleets are integrated, lead vehicles in the fleets which participates in the integration negotiate with each other to determine the lead vehicle in the integrated fleet. If one V2X fleet is split, the lead vehicle before the split continues to serve as the lead vehicle in the split fleet, or a new lead vehicle may be selected.

By the solution provided by the exemplary embodiment, the load of the RSU in the V2X communication can be reduced, dynamic configuration of V2X fleet can be realized and thereby V2X fleet management efficiency can be improved.

Figure 11:
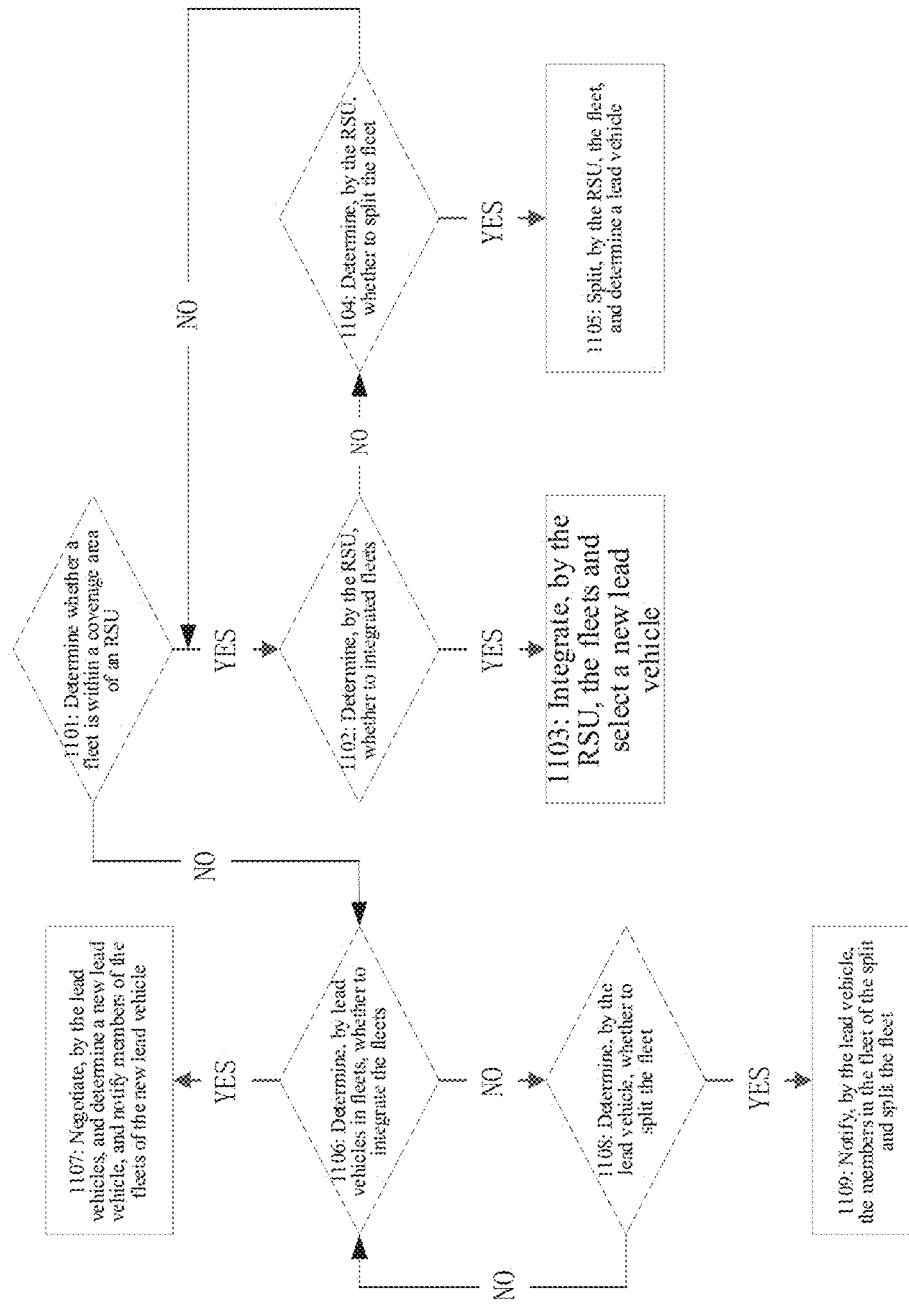
FIG. 11 is a flow chart illustratively showing a V2X communication-based fleet management method in a V2X system according to an exemplary embodiment of the present disclosure.

FIG. 11 is a flow chart illustratively showing a V2X communication-based fleet management method in a V2X system according to an exemplary embodiment of the present disclosure. As shown in FIG. 11, the method may include the follow steps.

In step 1101, whether a fleet is within a coverage area of an RSU is determined. If the fleet is within the coverage area of the RSU, the flow chart proceeds to step 1102. If the fleet is not within the coverage area of the RSU, the flow chart proceeds to step 1106.

A fleet here refers to a group of vehicles in V2X communication of a V2X system organized by an On Board Unit (OBU) according to a certain rule. Each fleet has a lead vehicle or a head vehicle (corresponding to the "designated vehicle" as mentioned in the above embodiments). The certain rule may refer to rules which are set by operators/business traders and are used for forming a fleet, including rules defined according to positions of vehicles, types of OBU, V2X services and so on. The purpose of a fleet is to facilitate management of OBUs in the fleet, for example, allocation of V2V/V2P wireless air interface resources. Each fleet has a unique identity, for example, a group ID.

The lead vehicle can be designated by the RSU (for fleets within the coverage of the RSU) or determined according to negotiation (for fleets outside the coverage of the RSU). The functions of the lead vehicle include allocating V2V/V2P wireless communication resources to members in a fleet, communicating with the RSU, broadcasting fleet information, communicating with other fleets, and so on. The lead vehicle in a fleet can be updated according to actual needs, and all members in the fleet can be informed of the update of the lead vehicle. The lead vehicle sends periodic broadcast information, the contents of which include at least of the identity of the fleet, and the identity of the lead vehicle. The contents may further include a resource pool, the identities of the members in the fleet, the services of the fleet, the speed of the fleet, the driving direction of the fleet, the identity of a substitute lead vehicle and so on.

It should be noted that members in the fleet may communicate with each other (V2X), may communicate with pedestrians (V2P), and may communicate with the lead vehicle (V2X); also, the members in the fleet may communicate with the RSU (V2I) (if the members are within the coverage of the RSU). The wireless communication resources for the communications between the members in the fleet, between the members in the fleet and pedestrians, and between the members in the fleet and the lead vehicle are allocated by the lead vehicle. The wireless communication resources for the communications between the members in the fleet and the RSU may be allocated by the RSU.

The functions of the lead vehicle are similar as that of the RSU. A fleet equals to a moving cell; when a member in the fleet needs to conduct V2V/V2P communication, the member may send a request to the lead vehicle of the fleet for wireless resources, or may select resources from a resource pool designated by the lead vehicle.

The RSU may be an eNB (evolved Node B) or a static UE (User Equipment) or a dedicated RSU (for example, an access point AP in 802.11P).

The expression "in (within) the coverage area of the RSU" refers to that all members in a fleet are within the coverage area of the RSU. The determination of whether a fleet is within the coverage area of the RSU is conducted by the RSU according to the positions of members in the fleet.

The size of a fleet is dynamic. For example, a fleet may only has a lead vehicle at the start, and then the number of the members in the fleet may change dynamically.

In step 1102, the RSU determines whether it is needed to integrate fleets. If the determination result is yes, the flow chart proceeds to step 1103. If the determination result is no, the flow chart proceeds to step 1104.

The RSU may determine whether it is needed to integrate fleets according to a plurality of conditions, for example, the driving directions and speeds of two or more fleets, the intervals between the fleets, the indication information of the lead vehicle, the strategies operators/business traders and so on.

In step 1103, the RSU integrates the fleets and selects a new lead vehicle.

The integration may include integration of at least two fleets. If there are a plurality of fleets that need to be integrated, every two fleets may be integrated and then the integrated fleets may be further integrated into a new fleet.

The integrated fleet has a new fleet identity and a new lead vehicle. The new lead vehicle is generally selected from two lead vehicles before the integration, or the RSU may select other vehicle than the old lead vehicles according to actual needs and rules as the new lead vehicle.

Assuming there are two fleets g1 and g2, the RSU integrates g1 and g2 into g3 and selects a vehicle C as the lead vehicle. Then the RSU notifies all members in g3 of information about the lead vehicle C, and notifies the lead vehicle C of information of members in the old fleets g1 and g2. If C is the lead vehicle in the old fleet g1, the RSU needs to notify the vehicle C of information of members in g2, and then RSU re-allocates wireless resources to the fleet g3 and notifies the lead vehicle C of the new resource pool. The lead vehicle C periodically broadcasts information of the fleet g3.

In step 1104, the RSU determines whether it is needed to split a fleet. If it is needed to split a fleet, the flow chart proceeds to step 1105. If it is not needed to split a fleet, the flow chart proceeds to step 1102.

The RSU may determine whether it is needed to split a fleet according to a plurality of conditions, for example, the driving direction of the fleet, the speeds of members in the fleet, the indication information from the lead vehicle, whether the fleet leaves the coverage area of the RSU, strategies of operators/business traders and so on. If the condition(s) for splitting is(are) meet, the RSU may decide to split the fleet.

In step 1105, the RSU splits the fleet and determines the lead vehicle.

The split refers to that for example, the lead vehicle of a fleet g1 is A, after the fleet g1 is split, if A is within the coverage area of the RSU and is suitable to serve as the lead vehicle, A can continue serve as the lead vehicle; otherwise, a new vehicle (for example, a vehicle B) may be selected to be the lead vehicle. The lead vehicle or the RSU can notify members leaving the fleet g1 and members remaining in the fleet g1 of the identities of the members in the fleet and the identity of the current lead vehicle.

The identity of the split fleet g1 can keep unchanged. After the split, the RSU can re-allocate a wireless resource pool to the fleet and notifies the lead vehicle of the wireless resource pool.

In step 1106, the lead vehicles determine whether it is needed to integrate fleets. If it is needed to integrate fleets, the flow chart proceeds to step 1107. If it is not needed to integrate fleets, the flow chart proceeds to step 1108.

If two or more fleets are outside the coverage area of the RSU, the two or more fleets receive broadcast information from each other, and determine whether it is needed to integrate fleets according to one or more of the following rules: the driving directions and speeds of the two or more fleets, the intervals between the two or more fleets, the indication information of the lead vehicle, strategies of operators/business traders and so on.

If the condition(s) for integrating one fleet is(are) met, and the lead vehicles agree with the integration, the lead vehicles can determine to integrate fleets.

In step 1107, the lead vehicles negotiate and determine a new lead vehicle and the members of the fleets are informed of the new lead vehicle.

The old lead vehicles can negotiate with each other to determine a new lead vehicle. Simple principles may be used to determine the new lead vehicle. For example, an old lead vehicle having a small ID among the old lead vehicles can be selected as the new lead vehicle. Or, other predefined rules can be used to determine the new lead vehicle. The predefined rules refer to rules for generating the lead vehicle which are defined by the RSU or operators/business traders.

The new lead vehicle obtains information about the fleets from other old lead vehicles, and sends periodically broadcast information to the new integrated fleet. The broadcast information may include identity of the new fleet and the identity of the new lead vehicle. The broadcast information may further include a resource pool, identities of members in the fleet, services of the fleet, the speed of the fleet, the driving direction of the fleet, the identity of a substitute lead vehicle in the fleet and so on.

In step 1108, the lead vehicles determine whether it is needed to split the fleets. If it is needed to split fleets, the flow chart proceeds to step 1109. If it is not needed to split fleets, the flow chart proceeds to step 1106.

A lead vehicle can determined whether it is needed to split the fleet according to a plurality of conditions, for example, the driving direction of the fleet, the speeds of the members in the fleet, indication information of members in the fleet, strategies of operators/business traders and so on.

If the condition(s) for splitting is(are) met, the lead vehicle can decide to split the fleet.

In step 1109, the lead vehicles notify members of the fleets and split the fleets.

A lead vehicle can broadcast information to indicate members remaining in the fleet and members leaving the fleet, the identity of the fleet, the identities of members in the fleet, and the identity of the lead vehicle. The contents of the notification may further include a resource pool, services of the fleet, the speed of the fleet, the driving direction of the fleet, the identity of a substitute lead vehicle in the fleet, and so on.

It should be noted that the lead vehicle and members in a fleet in the above exemplary embodiments may include an On Board Unit (OBU), which equals to a User Equipment (UE).

The present disclosure will be described in details with reference to drawings and the following exemplary embodiments.

Exemplary Embodiment 1

Figure 12:
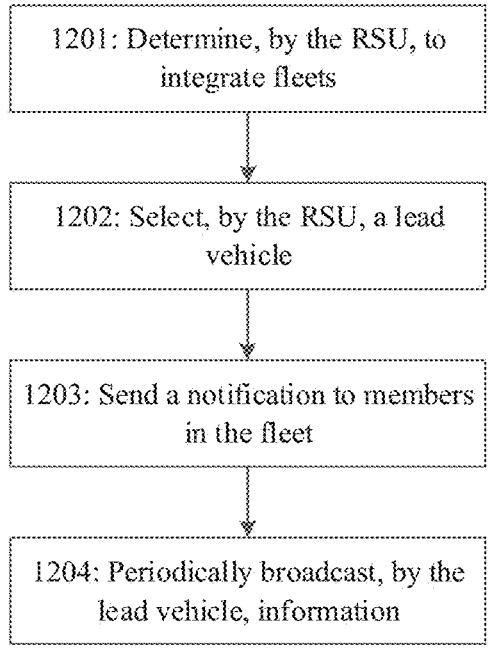
FIG. 12 is a flow chart illustratively showing a method according to an exemplary embodiment of the present disclosure.

The exemplary embodiment 1 is proposed for a scenario that fleets are integrated within a coverage area of an RSU. FIG. 12 is a flow chart illustratively showing a method according to the exemplary embodiment 1. As shown in FIG. 12, the method may include the following steps.

In step 1201, the RSU determines to integrate fleets.

The RSU may determine whether it is needed to integrate fleets according to a plurality of conditions, for example, the driving directions and speeds of two or more fleets, the intervals between the fleets, the indication information of the lead vehicle, the services of the fleets, the strategies operators/business traders and so on. If the RSU determines to integrate fleets, the RSU sends instruction information to lead vehicles of fleets which need to be integrated to instruct the fleets that they are to be integrated.

The lead vehicles of fleets may send requests to the RSU to request for integration, and after receiving the requests, the RSU may determine whether to integrate fleets and send responses to the OBUs of the lead vehicles which send the requests.

In step 1202, the RSU selects a lead vehicle.

The integrated fleet has a new fleet identity and a new lead vehicle. The new lead vehicle is generally selected from two lead vehicles before the integration (this can be determined by the RSU), or the RSU may select other vehicle than the old lead vehicles according to actual needs and rules as the new lead vehicle.

In a specific application scenario, assuming there are two fleets g1 and g2, the RSU integrates g1 and g2 into g3 and selects a vehicle C as the lead vehicle. Then the RSU notifies all members in g3 of information about the lead vehicle C, and notifies the lead vehicle C of information of members in the old fleets g1 and g2. If C is the lead vehicle in the old fleet g1, the RSU needs to notify the vehicle C of information of members in g2, and then RSU re-allocates wireless resources to the fleet g3 and notifies the lead vehicle C of the new resource pool.

After the RSU determines the lead vehicle, the RSU first notifies old lead vehicles before integration of the new fleet identity and the identity of the new lead vehicle. The contents of the notification may further include the period for the lead vehicle to broadcast information, the resource pool, the identities of members in the fleet.

In step 1203, a notification is sent to members of the fleet.

The notification may be sent by the RSU or the lead vehicles before integration, and the notification may include at least the new fleet identity and the identity of the lead vehicle. The notification may further include identities of members in the fleet.

The notification may be sent periodically via broadcast information.

In step 1204, the lead vehicle periodically broadcast information.

The lead vehicle periodically sends broadcast information. The broadcast contents may include at least the identity of the fleet, the identities of members in the fleet, and the identity of the lead vehicle. The broadcast contents may further include a resource pool, the period for the lead vehicle to broadcast information, the services of the fleet, the speed of the fleet, the driving direction of the fleet, the identity of a substitute lead vehicle in the fleet, and so on.

Exemplary Embodiment 2

The exemplary embodiment 2 is proposed for a scenario that fleets are split within a coverage area of an RSU. FIG.

Figure 13:
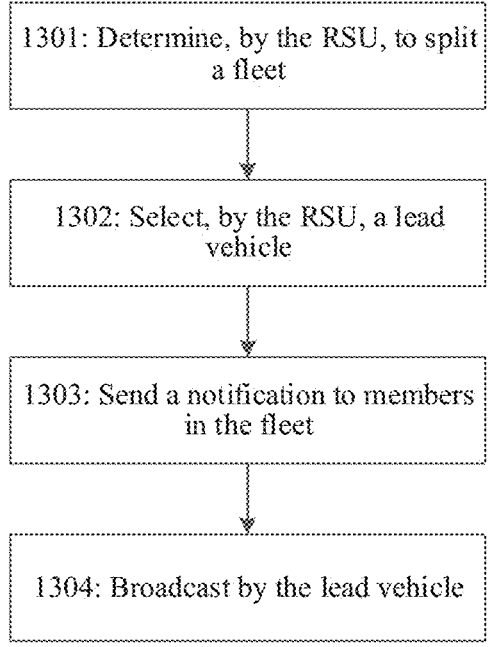
FIG. 13 is a flow chart illustratively showing a method according to another exemplary embodiment of the present disclosure.

13 is a flow chart illustratively showing a method according to the exemplary embodiment 2. As shown in FIG. 13, the method may include the following steps.

In step 1301, the RSU determines to split a fleet.

The RSU may determine whether it is needed to split a fleet according to a plurality of conditions, for example, the driving direction of the fleet, the speeds of members in the fleet, the indication information of the lead vehicle, whether the fleet leaves the coverage area of the RSU, the strategies operators/business traders and so on. If the conditions for split are met, the RSU determines to split the fleet.

The lead vehicle in the fleet may send a split request to the RSU, and after reviving the request, the RSU determines whether it is needed to split the fleet and send responses to the OBU of the lead vehicle which sends the request.

In step 1302, the RSU selects a lead vehicle.

In a specific application scenario, assuming the old fleet g1 before split has a lead vehicle A. After the fleet g1 is split, if A is within the coverage area of the RSU and is suitable to serve as the lead vehicle, the vehicle A can continue to serve as the lead vehicle; otherwise, a new vehicle (for example, a vehicle B) may be selected as the lead vehicle.

After the fleet g1 is split, the identity of the split fleet can keep unchanged or can be updated. After split, the RSU may re-allocate wireless resources to the fleet and notifies the lead vehicle of the newly allocated wireless resources. After the RSU determines the lead vehicle, the RSU notifies the lead vehicle of the identity of the fleet, and members of the fleet. The contents of the notification may further include a resource pool, and the period for the lead vehicle to broadcast information. The sending of the notification may be realized in a V2V manner.

In step 1303, a notification is sent to members of the fleet.

The lead vehicle or the RSU sends a notification members leaving the fleet g1 and the members remaining in the fleet g1 about identity of the fleet, the members of the fleet, and the current lead vehicle. The notification may be broadcast.

The members leaving the fleet may form a new fleet or may be independent vehicles. Specific operations may be conducted according to instructions of RSU or a predefined rule.

In step 1304, the lead vehicle periodically broadcast information.

The OBU of the lead vehicle periodically sends broadcast information. The broadcast contents may include the identity of the fleet, the identities of members in the fleet, and the identity of the lead vehicle. The broadcast contents may further include a resource pool, the period for the lead vehicle to broadcast information, the services of the fleet, the speed of the fleet, the driving direction of the fleet, the identity of a substitute lead vehicle in the fleet, and so on.

Exemplary Embodiment 3

Figure 14:
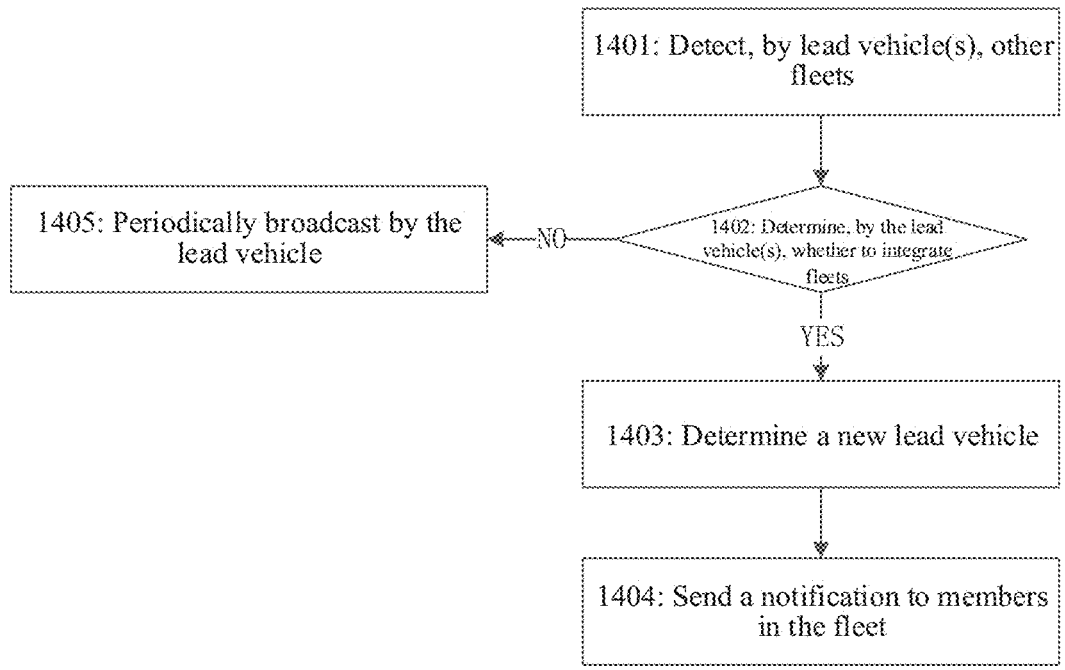
FIG. 14 is a flow chart illustratively showing a method according to another exemplary embodiment of the present disclosure.

The exemplary embodiment 3 is proposed for a scenario that fleets are integrated outside a coverage area of an RSU. FIG. 14 is a flow chart illustratively showing a method according to the exemplary embodiment 3. As shown in FIG. 14, the method may include the following steps.

In step 1401, a lead vehicle detects other fleets.

The lead vehicle may receive broadcast information sent by other fleets, and may thereby determine that there exist other fleets nearby. The lead vehicle may send information to the lead vehicles of the other fleets to ask whether the lead vehicles in the other fleets wish to integrate. After receiving the information, the lead vehicles in the other fleets respond to the lead vehicle by sending a yes or no.

In step 1402, the lead vehicle determines whether to integrate. If the determination result is yes, the flow chart proceeds to step 1403. If the determination result is no, the flow chart proceeds to step 1405.

If two or more fleets are outside the coverage area of the RSU, two or more lead vehicles can receive broadcast information from each other, and then determine whether it is needed to integrate the fleets according to one or more of the following rules: the driving directions of the two or more fleets, the speeds of the fleets, the intervals between the fleets, the indication information of the lead vehicles, strategies of operators/business traders and so on.

If the conditions for integrating the fleets into one fleet are met and the lead vehicles of the fleets agree with the integration, the integration can be conducted.

In step 1403, a new lead vehicle is determined.

The lead vehicles participating in the integration can negotiate with each other and select a new lead vehicle according to a certain rule. The new lead vehicle is usually one of the lead vehicles before the integration, or may be a vehicle which is selected according to suggestions of the lead vehicles before integration, for example, a substitute lead vehicle in an old fleet before integration.

1) If the new lead vehicle is one (for example, a vehicle A) of the lead vehicles before integration, an old lead vehicle B (this old lead vehicle is not selected as the new lead vehicle) may notify A of identities of members in the fleet g2 which the vehicle B resides in, and notify the old fleet g2 of the new lead vehicle A and the new fleet identity g3.

2) If the new lead vehicle is a newly selected vehicle C, the old lead vehicles A and B notify the vehicle C of the identities of members in the fleets which vehicles A and B reside in.

In step 1404, the new lead vehicle sends a notification to members of the fleet.

The lead vehicle notifies the members in the integrated fleet of the identity of the fleet, the identity of the lead vehicle, the identities of members in the fleet. The notified information may further include a resource pool, the period for the lead vehicle to broadcast information, the services of the fleet, the speed of the fleet, the driving direction of the fleet, the identity of a substitute lead vehicle in the fleet and so on.

In step 1405, the lead vehicle periodically broadcast information.

If the fleets are not integrated, the old lead vehicle continues to periodically broadcast information.

Exemplary Embodiment 4

Figure 15:
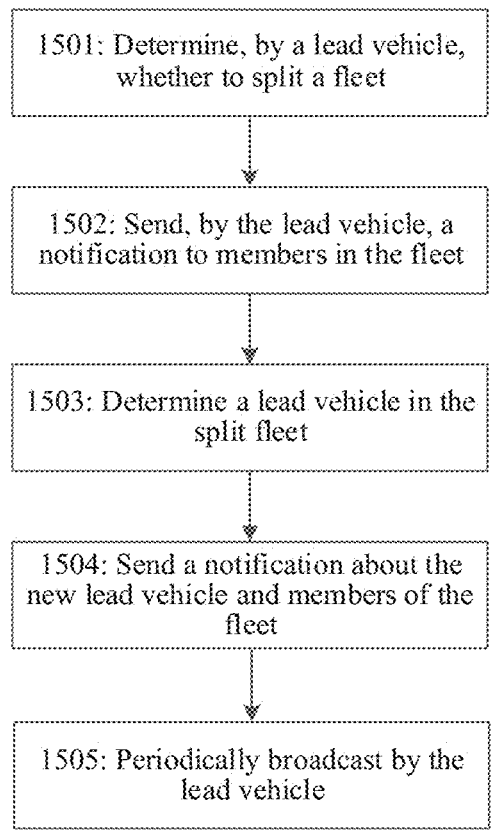
FIG. 15 a flow chart illustratively showing a method according to an exemplary embodiment of the present disclosure.

The exemplary embodiment 4 is proposed for a scenario that a fleet is split outside a coverage area of an RSU. FIG. 15 is a flow chart illustratively showing a method according to the exemplary embodiment 4. As shown in FIG. 15, the method may include the following steps.

In step 1501, a lead vehicle determines that it is needed to split a fleet.

The lead vehicle may determine whether it is needed to split the fleet according to a plurality of conditions, for example, the driving direction of the fleet, the speeds of the members in the fleet, information indicating members in the fleet, strategies of operators/business traders and so on. If the conditions for split are met, the lead vehicle may determine to split the fleet.

In step 1502, the lead vehicle sends a notification to members in the fleet.

The lead vehicle broadcasts a notification to members leaving the fleet and members remaining in the fleet to inform the members that the fleet is to be split, and to inform the members of the identities of the members remaining in the fleet and the identity of the fleet.

In step 1503, a lead vehicle in the split fleet is determined.

In a specific application scenario, assuming that a lead vehicle in the old fleet g1 before split is a vehicle A. After the fleet g1 is split, if the vehicle A is suitable to serve as a lead vehicle, the vehicle A continues to serve as the lead vehicle; otherwise, a new vehicle (for example, a vehicle B) is selected as the lead vehicle. The lead vehicle B is selected by the old lead vehicle A and the old lead vehicle A notifies the vehicle B that the vehicle B will be the new lead vehicle. The lead vehicle B may be a substitute lead vehicle in the old fleet g1.

The identity of the split fleet g1 may keep unchanged or may be updated. After split, the lead vehicle re-allocates wireless resources for the fleet.

In step 1504, a notification about the new lead vehicle and members of the fleet is sent.

If the lead vehicle remains the same, the lead vehicle sends the notification to the members of the fleet. If the lead vehicle is changed, the old lead vehicle sends the notification about the new lead vehicle and members of the fleet. The notification may include the identity of the fleet, the identities of the members in the fleet, and the identity of the lead vehicle. Contents of the notification may further include a resource pool, and the period for the lead vehicle to broadcast information. The notification may be sent in a V2V manner.

In step 1505, the lead vehicle periodically broadcast information.

The lead periodically broadcast information, such as the identity of the fleet, the identities of members in the fleet and the identity of the lead vehicle. The broadcast contents may further include a resource pool, services of the fleet, the speed of the fleet, the driving direction of the fleet, the identity of a substitute lead vehicle in the fleet, and so on.

Figure 16:
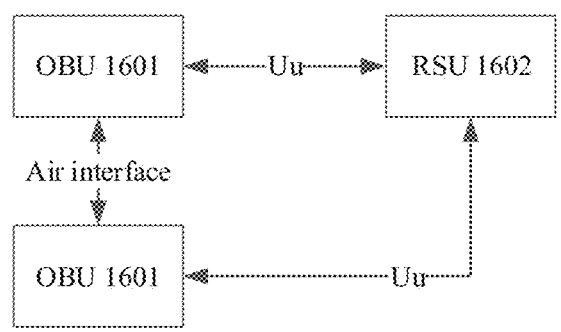
FIG. 16 is a schematic diagram illustratively showing a fleet management system according to an exemplary embodiment of the present disclosure.

FIG. 16 is a schematic diagram illustratively showing a fleet management system according to an exemplary embodiment of the present disclosure. As shown in FIG. 16, the system may include an OBU 1601, and an RSU 1602. The RSU 1602 is configured to select a lead vehicle within the coverage area of the RSU, determine whether to integrate/split fleets, and send notifications about the selected lead vehicle and members of fleets. The OBU 1601 is configured to receive notification information broadcast by the RSU1602, determine whether it is needed to integrate/split fleets, send instruction information to the RSU 1602, and receive information sent from other OBU 70.

Figure 17:
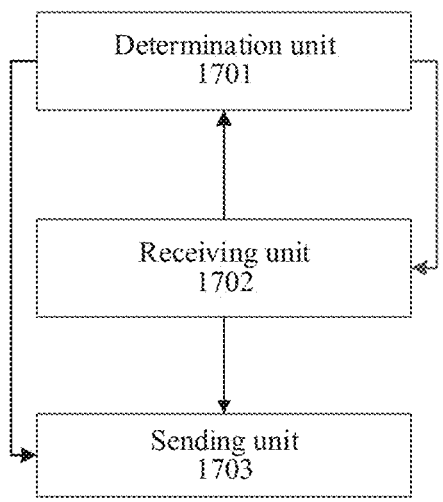
FIG. 17 is a schematic diagram illustratively showing an OBU for fleet management according to an exemplary embodiment of the present disclosure.

FIG. 17 is a schematic diagram illustratively showing an OBU for fleet management according to an exemplary embodiment of the present disclosure. As shown in FIG. 17, the OBU may include a determination unit 1701, a receiving unit 1702 and a sending unit 1703. The determination unit 1701 is configured to determine whether it is needed to integrate fleets/split a fleet. The receiving unit 1702 is configured to receive instruction information from the RSU, and receive instruction information from other OBU. The sending unit 1703 is configured to send instruction to the RSU and other OBU.

It should be noted that the modules are described above may be realized by software or hardware. For the latter, the modules may be realized in the following ways: the modules are in the same processor; or the modules are in a plurality of processors. The present disclosure is not limited to this.

Embodiments of the present disclosure further provide a storage medium. According to an exemplary embodiment, the storage medium may be configured to store program codes for performing the following steps.

In S1, in a coverage area of a Road Side Unit (RSU), the RSU determines whether state information of a plurality of vehicle groups in the coverage meets a first preset condition for integrating the plurality of vehicle groups and/or a second preset condition for splitting the plurality of vehicle groups. And/or, outside the coverage area of the RSU, a designated vehicle in a plurality of vehicle groups determines whether state information of the plurality of vehicle groups meets a first preset condition for integrating the plurality of vehicle groups and/or a second preset condition for splitting the plurality of vehicle groups. The designated vehicle has a management right for managing the vehicle groups.

In S2, if the determination result is yes, in the coverage area of the RSU, the RSU integrates the plurality of vehicle groups according to the first preset condition and/or split a vehicle group according to the second preset condition; and/or, outside the coverage area of the RSU, the designated vehicle integrates the plurality of vehicle groups according to the first preset condition and/or split the vehicle group according to the second preset condition.

In S3, in the coverage area of the RSU, the RSU designates a vehicle in the integrated and split vehicle groups as a designated vehicle; and/or, outside the coverage area of the RSU, designated vehicles before integration and/or split negotiate and determine a vehicle as the designated vehicle in the integrated and/or split vehicle groups.

According to an exemplary embodiment, the storage medium may include but not limited to: USB flash disk, a Read Only Memory (ROM), a Random Access Memory (RAM), a removable hard disk, a magnetic disk, or an optical disk, or other medium capable of storing program codes.

Details of the example embodiment can be found in the descriptions regarding the above exemplary embodiments and repeated descriptions are omitted here.

Obviously, those skilled in the art should understand that each module or each step of the present disclosure described above can be implemented by general purpose computing devices, which can be centralized on a single computing device or distributed over a network formed by multiple computing devices. Alternatively, the modules or steps in the present disclosure be implemented with program codes executable by a computing device, and the program codes may be stored in a storage device for execution by a computing device. In some cases, the steps shown or described herein may be executed in an order different from that described herein. The steps or modules described herein can be made into individual integrated circuit modules, or a plurality of modules or steps can be made into a single integrated circuit module. As such, the present disclosure is not limited to any specific combination of hardware and software.

The foregoing descriptions are merely exemplary embodiments of the present disclosure and are not intended to limit the present disclosure. For those skilled in the art, many changes and modifications can be made to the present disclosure. Any modification, equivalent replacement, improvement and so on within the spirit and principle of the present disclosure should be encompassed in the protection scope of the present disclosure.

INDUSTRIAL APPLICABILITY

Embodiments of the present disclosure provide a vehicle group management method and device in a V2X system.

The method includes: in a coverage area of a Road Side Unit (RSU), determining, by the RSU and/or a designated vehicle in a plurality of vehicle groups, whether state information of the plurality of vehicle groups meets a first preset condition for integrating the plurality of vehicle groups and/or a second preset condition for splitting the plurality of vehicle groups, wherein the designated vehicle has a management right for managing the vehicle groups; if it is determined that the state information of the plurality of vehicle groups meets the first preset condition for integrating the plurality of vehicle groups and/or the second preset condition for splitting the plurality of vehicle groups, integrating, by the RSU and/or the designated vehicle in the plurality of vehicle groups, the plurality of vehicle groups according to the first preset condition, and/or splitting, by the RSU and/or the designated vehicle in the plurality of vehicle groups, the plurality of vehicle groups according to the second preset condition; and designating, by the RSU, a vehicle in the integrated vehicle groups and/or split vehicle groups as the designated vehicle. The present disclosure can solve the problem in related arts that when there are a plurality of vehicle groups, it is hard to allocate and release resources for each vehicle group.

What is claimed is:

1. A vehicle group management method in a Vehicle to Everything (V2X) system, comprising:
   in a coverage area of a Road Side Unit (RSU), determining, by the RSU or a designated vehicle in a plurality of vehicle groups, whether state information of the plurality of vehicle groups meets a first preset condition for integrating the plurality of vehicle groups or a second preset condition for splitting the plurality of vehicle groups, wherein the designated vehicle has a management right for managing the vehicle groups;
   if it is determined that the state information of the plurality of vehicle groups meets the first preset condition for integrating the plurality of vehicle groups or the second preset condition for splitting the plurality of vehicle groups, integrating, by the RSU or the designated vehicle in the plurality of vehicle groups, the plurality of vehicle groups according to the first preset condition, or splitting, by the RSU or the designated vehicle in the plurality of vehicle groups, the vehicle groups according to the second preset condition; and
   designating, by the RSU, a vehicle in the integrated vehicle groups or the split vehicle groups as a currently designated vehicle,
   wherein the management method further comprises:
   sending, by the currently designated vehicle in the integrated vehicle groups or the split vehicle groups, broadcast information which is periodically sent, wherein the broadcast information comprises at least one of identities of the vehicle groups, an identity of the currently designated vehicle, a resource pool, identities of vehicles in the vehicle groups, services of the vehicle groups, driving speeds of the vehicle groups, and driving directions of the vehicle groups,
   notifying, by the currently designated vehicle in the integrated vehicle groups or the split vehicle groups or the RSU, vehicles that leaves the vehicle groups and vehicles that remain in the vehicle groups of identities of vehicles in the vehicle groups and an identity of the currently designated vehicle; and
   allocating, by the RSU, a wireless resource pool for the integrated vehicle groups or the split vehicle groups and notifying the currently designated vehicle of the allocated wireless resource pool.

2. The management method according to claim 1, wherein the state information comprises at least one of driving directions of the vehicle groups, driving speeds of the vehicle groups, intervals between the vehicle groups, indication information of a vehicle for managing the vehicle groups, and V2X services.

3. The management method according to claim 1, wherein:
   the first preset condition comprises that driving directions of the plurality of vehicle groups are consistent, that driving speeds of vehicles in the plurality of vehicle groups are within a first preset range, intervals between the plurality of vehicle groups are within a second preset range, integration indication information, and the same V2X services;
   the second preset condition comprises that driving directions of vehicles in the plurality of vehicle groups are not consistent, that driving speeds of vehicles in the plurality of vehicle groups are not within the first preset range, intervals between the plurality of vehicle groups are not within the second preset range, split indication information, and different V2X services.

4. The management method according to claim 1, wherein the RSU is an evolved Node B (eNB) or a static User Equipment (UE) or a dedicated RSU.

5. The management method according to claim 1, wherein member vehicles in a vehicle group comprise an On Board Unit (OBU), which equals to a User Equipment (UE).

6. A vehicle group management method in a Vehicle to Everything (V2X) system, comprising:
   outside a coverage area of a Road Side Unit (RSU), determining, by a designated vehicle in a plurality of vehicle groups, whether state information of the plurality of vehicle groups meets a second preset condition for splitting the plurality of vehicle groups, wherein the designated vehicle has a management right for managing the vehicle groups;
   if it is determined that the state information of the plurality of vehicle groups meets the second preset condition for splitting the plurality of vehicle groups, splitting, by the designated vehicle, the vehicle groups according to the second preset condition; and
   determining a vehicle in the split vehicle groups as a currently designated vehicle according to negotiation between the designated vehicles before split of the vehicle groups, or according to a predefined rule,
   wherein the management method further comprises:
   sending, by the currently designated vehicle in the split vehicle groups, broadcast information which is periodically sent, wherein the broadcast information comprises at least one of identities of the vehicle groups, an identity of the currently designated vehicle, a resource pool, identities of vehicles in the vehicle groups, services of the vehicle groups, driving speeds of the vehicle groups, and driving directions of the vehicle groups
   notifying, by the currently designated vehicle in the split vehicle groups or the RSU, vehicles that leaves the vehicle groups and vehicles that remain in the vehicle groups of identities of vehicles in the vehicle groups and an identity of the currently designated vehicle; and
   employing, by the split vehicle groups, a negotiated or pre-configured wireless resource.

7. The management method according to claim 6, wherein the state information comprises at least one of driving directions of the vehicle groups, driving speeds of the vehicle groups, intervals between the vehicle groups, indication information of a vehicle for managing the vehicle groups, and V2X services.

8. The management method according to claim 6, wherein:
the second preset condition comprises that driving directions of vehicles in the plurality of vehicle groups are not consistent, that driving speeds of vehicles in the plurality of vehicle groups are not within the first preset range, intervals between the plurality of vehicle groups are not within the second preset range, split indication information, and different V2X services.

9. The management method according to claim 6, further comprising:
outside the coverage area of the RSU, determining, by the designated vehicle, whether state information of the plurality of vehicle groups meets a first preset condition for integrating the plurality of vehicle groups;
if it is determined that the state information of the plurality of vehicle groups meets the first preset condition for integrating the plurality of vehicle groups, integrating, by the designated vehicle, the plurality of vehicle groups according to the first preset condition; and
determining a vehicle in the integrated vehicle groups as a currently designated vehicle according to negotiation between the designated vehicles before integration of the vehicle groups, or according to a predefined rule.

10. The management method according to claim 9, wherein:
the first preset condition comprises that driving directions of in the plurality of vehicle groups are consistent, that driving speeds of vehicles in the plurality of vehicle groups are within a first preset range, intervals between the plurality of vehicle groups are within a second preset range, integration indication information, and the same V2X services.

11. The management method according to claim 9, further comprising:
sending, by the currently designated vehicle in the integrated vehicle groups, broadcast information which is periodically sent, wherein the broadcast information comprises at least one of identities of the vehicle groups, an identity of the currently designated vehicle, a resource pool, identities of vehicles in the vehicle groups, services of the vehicle groups, driving speeds of the vehicle groups, and driving directions of the vehicle groups.

12. The management method according to claim 11, further comprising:

notifying, by the currently designated vehicle in the integrated vehicle groups or the RSU, vehicles that leaves the vehicle groups and vehicles that remain in the vehicle groups of identities of vehicles in the vehicle groups and an identity of the currently designated vehicle; and
employing, by the integrated vehicle groups, a negotiated or pre-configured wireless resource.

13. A non-transitory computer-readable storage medium for storing computer executable instructions, which are configured to perform a vehicle group management method in a Vehicle to Everything (V2X) system, which comprises:
in a coverage area of a Road Side Unit (RSU), determining, by the RSU or a designated vehicle in a plurality of vehicle groups, whether state information of the plurality of vehicle groups meets a first preset condition for integrating the plurality of vehicle groups or a second preset condition for splitting the plurality of vehicle groups, wherein the designated vehicle has a management right for managing the vehicle groups;
if it is determined that the state information of the plurality of vehicle groups meets the first preset condition for integrating the plurality of vehicle groups or the second preset condition for splitting the plurality of vehicle groups, integrating, by the RSU or the designated vehicle in the plurality of vehicle groups, the plurality of vehicle groups according to the first preset condition, or splitting, by the RSU or the designated vehicle in the plurality of vehicle groups, the vehicle groups according to the second preset condition; and
designating, by the RSU, a vehicle in the integrated vehicle groups or the split vehicle groups as a currently designated vehicle,
wherein the management method further comprises:
sending, by the currently designated vehicle in the split vehicle groups, broadcast information which is periodically sent, wherein the broadcast information comprises at least one of identities of the vehicle groups, an identity of the currently designated vehicle, a resource pool, identities of vehicles in the vehicle groups, services of the vehicle groups, driving speeds of the vehicle groups, and driving directions of the vehicle groups
notifying, by the currently designated vehicle in the split vehicle groups or the RSU, vehicles that leaves the vehicle groups and vehicles that remain in the vehicle groups of identities of vehicles in the vehicle groups and an identity of the currently designated vehicle; and
employing, by the split vehicle groups, a negotiated or pre-configured wireless resource.

* * * * *